INVENTORS
ROBERT E. FORRESTER
GEORGE T. DOWNEY

INVENTORS
ROBERT E. FORRESTER
GEORGE T. DOWNEY

BY Dicker & Craig

ATTORNEYS

United States Patent Office 3,487,932
Patented Jan. 6, 1970

---

3,487,932
FILTER ELEMENT FAIRING MEANS
Robert E. Forrester and George T. Downey, Corry, Pa.,
assignors to Aero-Flow Dynamics, Inc., Corry, Pa.
Filed Feb. 24, 1967, Ser. No. 618,462
Int. Cl. B01d 27/00
U.S. Cl. 210—130        13 Claims

ABSTRACT OF THE DISCLOSURE

A filter assembly for fluid systems containing a filter element fairing means. By arranging a fairing member, for example, a cylindrical fairing sheet member inside the filter element, thereby defining a channel of reduced flow passage with respect thereto, and by directing substantially of the fluid, for example liquid fuel, through said channel, fuel flow is produced at a higher unit velocity which thus prevents the heavier matter, for example water droplets, from separating from the fuel and settling in the bottom of the filter element.

Background of the invention

The present invention relates to an improved filter means for flowing liquids, such as for example, gasoline fuel, which substantially eliminates heavier matter contained in the fuel, such as for example, water droplets, from separating from the fuel and settling to the bottom of the filter element. More particularly, the present invention concerns a means for increasing the velocity of the fuel flow after it has passed through the filter element thus preventing the heavier water droplets contained in the fuel from settling to the bottom of the filter element.

In fluid handling systems, such as for example, fuel systems, fuel filter means are frequently utilized in order to deliver to the motor or engine part, fuel which is relatively free of contamination. A certain percentage of water is always dissolved within the fuel itself and usually a certain amount of water is carried as entrained and finally dispersed droplets within the fuel. This is particularly true in the case of jet fuel which has a considerable affinity for water. Large quantities of water can frequently be made to precipitate out of the fuel by various methods, such as for example, through the use of coalescers or water separators. However, once the fuel is in the fuel system of an engine, for example, the fuel system of an airplane, and especially, once the fuel in the fuel system is headed toward the engine, it is desirable that any finely divided water entrained in the fuel be allowed to remain in that condition since the engine and its accessory equipment are properly designed to handle such a fuel-water mixture.

It has been found that when fuel passes through a fuel filter there is a definite tendency for the finely divided particles to agglomerate into somewhat larger particles. It is desirable that once these particles have agglomerated, the velocity of the fuel stream should be maintained sufficiently high enough to carry these particles downstream. Since water is heavier than the fuel, there is a natural tendency for the agglomerated particles of water to accumulate in any low spot in the system.

Filter elements are frequently cylindrical in form and may consist of paper or metal cloth which has been pleated in order to provide a maximum surface area for the filter medium in a given cylindrical space. In filter elements of this type, fuel enters the element from the outside, passes through the filter to the center of the element from where it is discharged from the filter element. The filter bowl itself acts as a settling chamber in which particulate matter and entrained water can collect. So long as this occurs on the upstream side of the filter element, the water can be readily drained from the sump and the bottom of the bowl, which is a standard procedure.

However, it has been found that heavier materials, such as water entrained within the fuel, upon striking the filter element pass through said element and settle on the downstream side of the filter element. Since the filter element is generally installed in a substantially vertical position, the direction of the fuel stream being removed from the filter element is generally straight up from the center of said element. If the velocity of the fuel stream in this area is slow, which it tends to be because of the large cylindrical shape oft he element, the difference in weight between the water droplets and the fuel causes the water to drop to the bottom of the filter element and collect. Over a given period of operation time, this amount of water can become sizeable, even to the point where it can completely fill the center of the filter element. Accumulations of water of any magnitude within the filter element becomes a very definite hazard to engine operation since if it were to get into the fuel stream of an engine as a large single glob, the engine at a particular instant would receive a supply of water rather than a supply of fuel which could certainly cause engine failure or engine flame-out. Accordingly, there is a need for providing an improved fuel filter system wherein substances entrained within the fuel, for example, water, are prevented from collecting on the downstream side of the fuel element.

An object of the present invention is to provide an improved fluid filter system, especially a fuel filter system which avoids the disadvantages and shortcomings of the present fuel filter systems.

Another object of the present invention is to provide an improved fuel filter element wherein the velocity of the filtered fuel discharging from the filter element, for example, from the center of the filter element, is substantially increased thus preventing substances entrained within the fuel, for example, water, from separating from the fuel and collecting in the bottom and on the downstream side of the filter element.

A further object of the present invention is to provide a fuel filter element which produces an increased discharge velocity in the fuel by channelling the filtered fuel through an area or chamber of substantially reduced cross-sectional area, thus preventing the water droplets from settling to the bottom of the filter element.

Other objects and further scope of the applicability of the present invention will become apparent from the detailed description given hereinafter; it should be understood, however, that a detailed description and specific examples, while indicating preferred embodiments of the present invention, are given by way of illustration only, since various changes and modifications within the spirit and scope of the invention will become apparent to those skilled in the art from this detailed description.

Summary of the invention

Pursuant to the present invention, it has been found that the above-mentioned disadvantages may be eliminated and a much improved fluid filtering system may be obtained if a fairing sheet member, for example, a cylindrical metal fairing member, having an outside diameter slightly smaller than the inside diameter of the filter element, is provided on the inside of said filter element. With the fairing in place, substantially all of the filtered fuel must rise through the channel defined by the inside diameter of the filter element and the outside diameter of the fairing member. Under these circumstances, fuel flow on the downstream side of the filter element is produced and maintained at a high unit of velocity thus preventing the heavier water droplets from settling to the bottom of the filter element. Although the fairing member is generally cylindrical, its dimensions can be adapted to conform to any filter element configuration. In addition, the fairing member can be disposed within the filter element to provide a substantially uniform channel for fuel flow or can be canted in one or more directions to achieve the desired velocity which, of course, is dependent upon the particular construction of the filter element and its application in the particular fuel system. Although the fairing member is advantageously made of sheet metal, other materials which are resistant to the attack of various types of fuel used in piston and jet engines can be used.

Each filter element in the filter assembly is advantageously a single continuous unit which extends substantially the entire length of the filter assembly. The fairing member extends substantially the entire length of the filter element and is displaced a definite distance from the filter element for substantially the entire length of said filter element.

Brief description of the drawings

The present invention will become fully understood from the detailed description hereinbelow and the accompanying drawings which are given by way of illustration only and thus are not limitive of the present invention and wherein.

Description of the preferred embodiments

Figure 1:
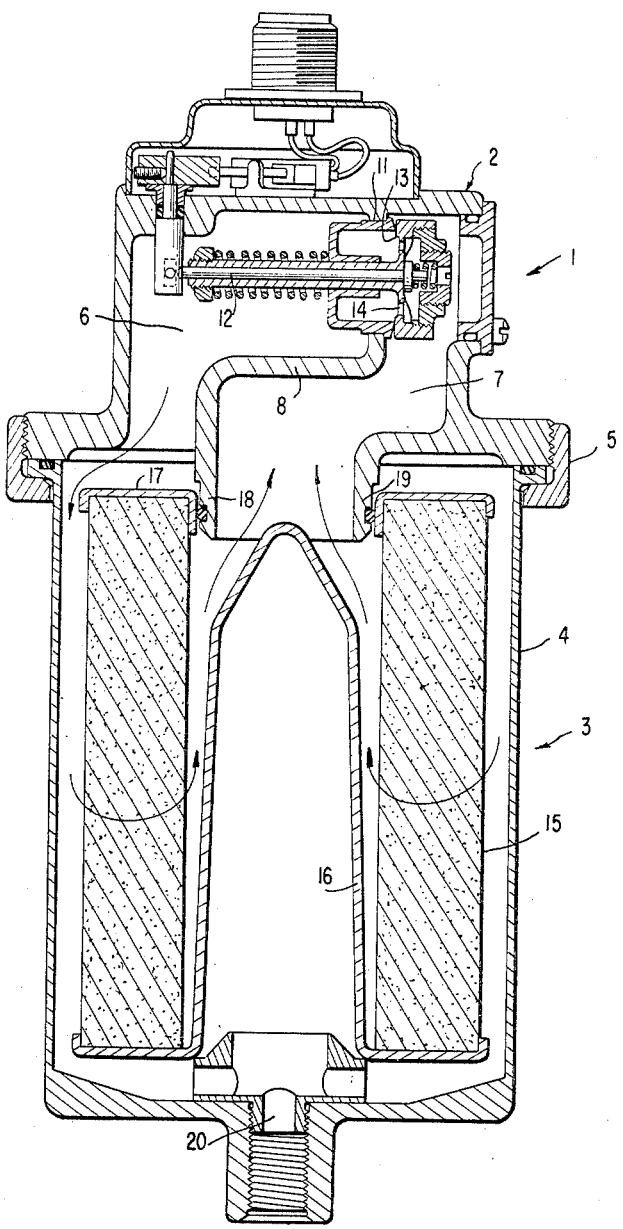
FIGURE 1 is a sectioned view in front elevation of a filter unit containing the filter assembly of the present invention.
Figure 2:
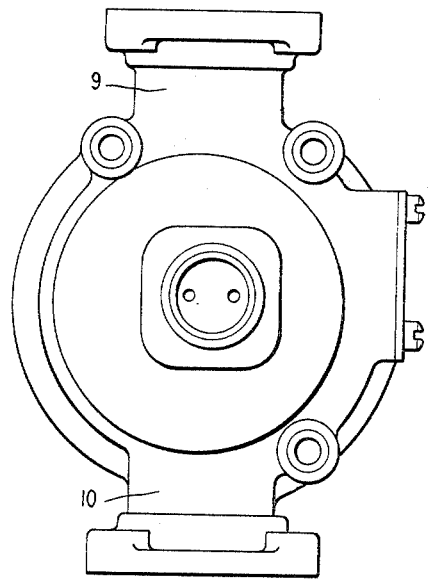
FIGURE 2 is a top or plan view of the filter element of FIGURE 1.

Refering more particularly to the drawings, FIGURE 1 shows the filter unit comprising a by-pass valve assembly 1 having an upper casing member 2, and a filter assembly 3 having a lower casing member 4. The upper casing member is releasably secured to the lower casing member by a suitable coupling 5. The by-pass valve assembly is divided into an inlet chamber 6 and an outlet chamber 7 by an integral partition 8. The partition 8 is formed to provide for a passage of fluid downwardly around the filter assembly and upwardly into the outlet chamber 7. The inlet 9 of the by-pass valve assembly (see FIGURE 2) directs fluid into inlet chamber 6 and after filtration, the fluid is directed to outlet chamber 7 and eventually to outlet 10.

The by-pass valve assembly 1 is provided to control the passage of fluid between chambers 6 and 7 through port 11 in partition 8. The by-pass valve assembly generally includes a stem 12 which is integral with a valve 13. The valve 13 is provided with a plurality of ports 14 which admit pressurized fluid from the inlet chamber 6. The details of the by-pass valve assembly have not been illustrated since it is merely typical of any number of by-pass assemblies which can be used to provide a means for by-passing the filter assembly when the latter becomes clogged or otherwise inoperative.

The filter assembly of the present invention comprises filter element 15 and a fairing 16 which in one embodiment of the invention is designed as an integral part of the filter element thus eliminating the need for an O-ring seal at the bottom. Each filter element is a single continuous unit which extends substantially the entire length of the filter assembly and is secured at its top by an element 17 which is rigidly attached to structural elements 18 and 19. The fairing 16 which is integral with the filter element at its bottom extends substantially the entire length of the filter element and is displaced a predetermined distance from the filter element for substantially the entire length of said element. This is provided so that the fluid can filter through the entire length of the filter element 15 before it is removed through the channel defined by the inside diameter of the filter element and the outside diameter of the fairing member. The fairing member can be disposed in the filter unit in any configuration which produces acceleration of the fluid after it passes through the filter element. For example, it may be substantially parallel to the filter element (see FIGURE 3) or the fairing member may be displaced away from or toward the filter element as it extends from the bottom to the top of the filter assembly.

The drain port 20 is provided at the bottom of lower casing member 4 and may be plugged or valved in any desired manner.

Figure 3:
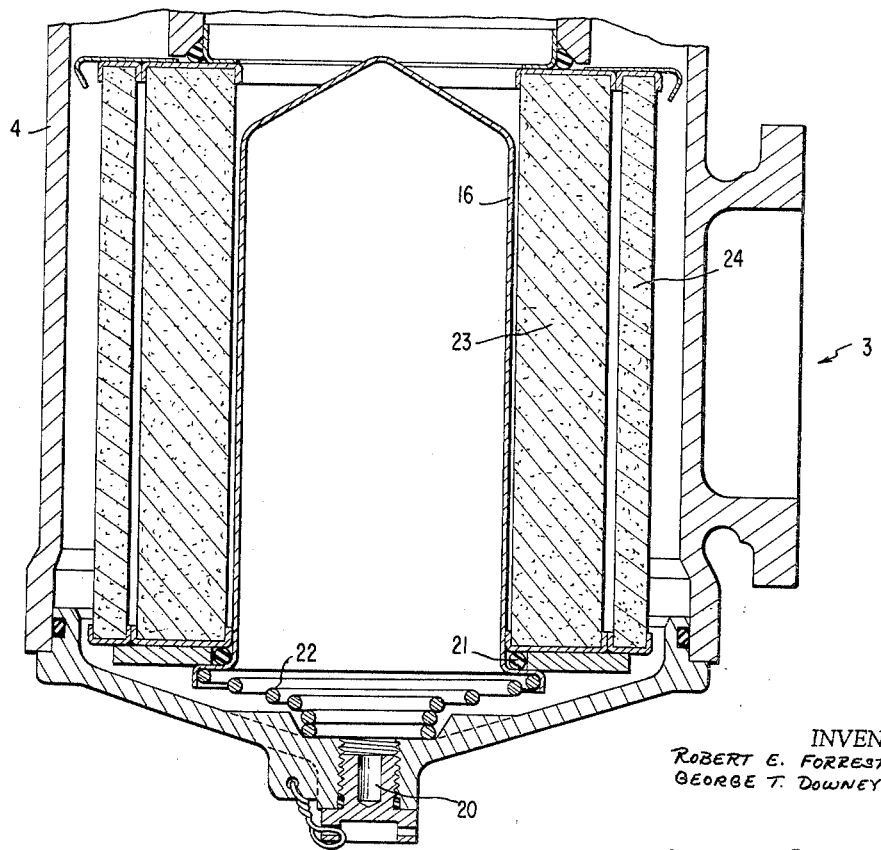
FIGURE 3 is a section view in front elevation of another embodiment of the filter assembly of the present invention.

FIGURE 3 is a cut-away view of the filter assembly of the present invention. In this embodiment, the fairing is essentially parallel to the filter elements for substantially the entire length of said elements and is provided as a separate piece sealed at the bottom with an O-ring 21 and held in place by a spring load 22. The filter assembly also comprises two filter elements, comprising an inner filter element 23 and an outer filter element 24 which are disposed substantially parallel to each other.

Figure 4:
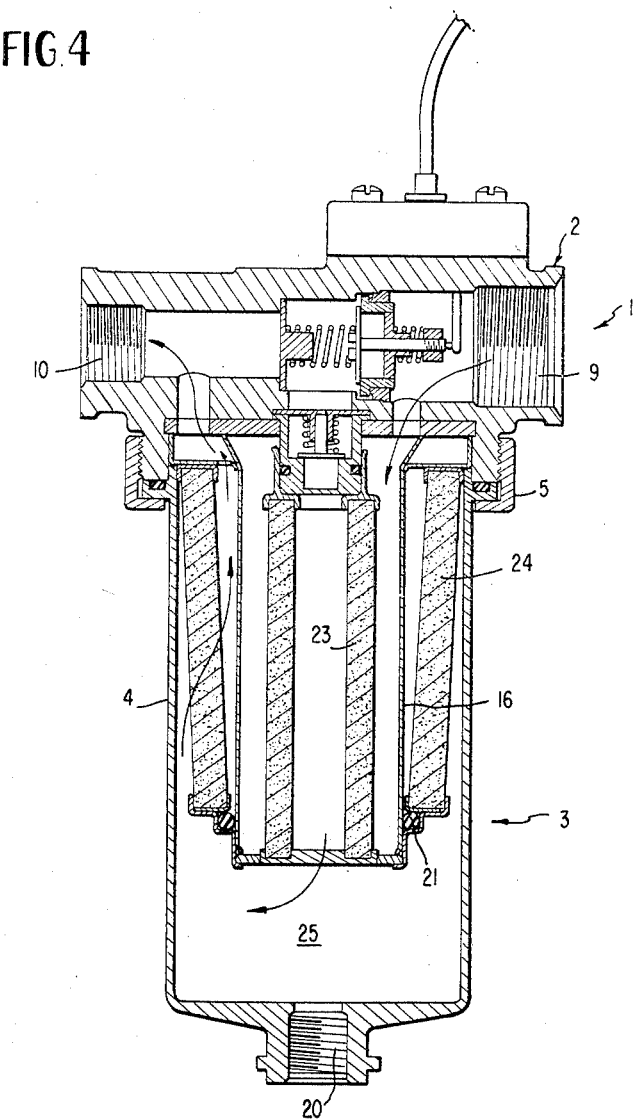
FIGURE 4 is a sectioned view in front elevation of still another embodiment of the filter element of the present invention.

FIGURE 4 illustrates another embodiment of the present invention wherein two filter elements 23 and 24 are located in the filter assembly. Fluid, for example, fuel, passes through an annular passage in the center of the unit to the bottom of the bowl 25 and from there goes to the outside diameter of the bowl and up through the outside filter element 24. This arrangement serves two purposes. All of the fuel flow having gone to the bottom of the bowl carries all contamination including water to the sump. From there, all of the fuel must go up to the outside filter element providing a maximum opportunity for fall out of contaminate matter into the sump. Once having filtered through the outside filter element, a tubular fairing 16 provides the same minimal flow passage leading to the outside in order to carry away any water that has passed through the element.

The operation of the filter element should be readily obvious to one skilled in the art. With pressurized fluid received in inlet chamber 6 and with the filter element 16 in a clean condition, fluid, for example, fuel, passes from inlet 9 to outlet 10 through filter element 15 as indicated by the flow lines in FIGURE 1. The fairing 16 provides a reduced flow passage leading to the outlet which accelerates the flow, thereby carrying away any water which has passed through the filter element. When fluid contamination causes a substantial clogging of the filter element 15, the by-pass valve becomes operative in any well known manner and directs the fuel directly through the inlet 9 to the outlet 10, thereby by-passing the filter assembly 3.

In FIGURE 4, arrows illustrate the direction of the fuel flow during a period of flow through the filter elements 23 and 24.

As previously mentioned, the filter unit of the present invention finds application in a variety of fluid filtering systems and is particularly advantageous when used to filter fuel in the fuel systems of piston and jet type engines.

Since modifications of this invention will be apparent to those skilled in the art, it is not desired to limit the invention to the exact constitution shown and described. Accordingly, all suitable modifications and equivalents as would be apparent to one skilled in the art are intended to be included.

What is claimed:

1. A filter assembly for fuel systems which comprises a casing defining a housing, an inlet chamber communicating with said housing for introducing a fluid to said housing, an outlet chamber communicating with said housing for removing said fluid from said housing, at least one filter element disposed in said housing and located in the fluid passage between the inlet and outlet chambers, such that the upstream surface of said filter element communicates with the inlet chamber and the downstream surface of said filter element communicates with the outlet chamber, and fairing means disposed on the downstream side of said filter element, said fairing means being arranged and constructed to maintain a high unit of velocity of fuel flow by defining a channel of reduced flow passage between the downstream surface of said filter element and the surface of said fairing means, said channel communicating with said outlet chamber.

2. The apparatus of claim 1, wherein fluid by-pass means is disposed between and communicates with said the surface of said fairing means, said channel communicating with said outlet chamber.

3. The apparatus of claim 1, wherein the filter element and the fairing means are substantially cylindrical, the outside diameter of said fairing means being slightly smaller than the inside diameter of said filter element.

4. The apparatus of claim 1, wherein said channel is substantially uniform for the entire length of the filter assembly.

5. The apparatus of claim 1, wherein said fairing means is canted from the lower portion to the upper portion of said filter element toward said filter element.

6. The apparatus of claim 1, wherein said fairing means is canted from the lower portion to the upper portion of said filter element away from said filter element.

7. The apparatus of claim 1, wherein the fairing means is an integral part of the filter element.

8. The apparatus of claim 1, wherein the fairing means is a separate unit sealed at its ends with O-rings and held in place at its bottom with a spring load.

9. The apparatus of claim 1, wherein two filter elements comprising an inner filter element and an outer filter element are provided in said housing in the fluid passage between said inlet and said outlet chambers.

10. The apparatus of claim 9, wherein the outer surface of the inner filter element communicates with the inlet chamber and the inner surface of the outer filter element communicates with the outlet chamber, said fairing means disposed on the downstream side of said outer filter element and defining a channel of reduced flow passage therewith.

11. The apparatus of claim 1, wherein the filter element extends substantially the entire length of the filter assembly.

12. The apparatus of claim 11, wherein the fairing means extend substantially the entire length of the filter element.

13. The apparatus of claim 11, wherein said filter element is one continuous unit.

References Cited

UNITED STATES PATENTS

| | | | |
|---|---|---|---|
| 2,638,228 | 5/1953 | Downey et al. | 55—510 X |
| 2,902,162 | 9/1959 | Humbert et al. | 210—438 |
| 3,193,102 | 7/1965 | Bottoms et al. | 210—137 |
| 3,270,884 | 9/1966 | Bremer | 210—315 X |
| 3,312,350 | 4/1967 | Kasten | 210—307 |
| 3,347,028 | 10/1967 | Erbstoesser | 55—510 |
| 3,216,571 | 11/1965 | Whiting et al. | 210—315 X |
| 3,283,902 | 11/1946 | Farris et al. | 210—315 X |

FOREIGN PATENTS

| | | |
|---|---|---|
| 863,266 | 1/1941 | France. |
| 641,215 | 1/1937 | Germany. |

REUBEN FRIEDMAN, Primary Examiner

F. A. SPEAR, JR., Assistant Examiner

U.S. Cl. X.R.

210—137, 315, 336, 342